(12) United States Patent
Hartmann et al.

(10) Patent No.: US 7,581,793 B2
(45) Date of Patent: Sep. 1, 2009

(54) VEHICLE SEAT

(75) Inventors: Michael P. Hartmann, Ypsilanti, MI (US); Timothy Butt, Plymouth, MI (US); Steven Boye, Canton, MI (US); Metodija Milevski, Sterling Heights, MI (US); Chih-cheng Liao, Ann Arbor, MI (US); Christopher James Cowan, Wixom, MI (US); Richard Hong, Grosse Pointe Woods, MI (US)

(73) Assignee: Johnson Controls Technology Company, Holland, MI (US)

( * ) Notice: Subject to any disclaimer, the term of this patent is extended or adjusted under 35 U.S.C. 154(b) by 38 days.

(21) Appl. No.: 11/829,679

(22) Filed: Jul. 27, 2007

(65) Prior Publication Data

US 2008/0284224 A1 Nov. 20, 2008

Related U.S. Application Data

(63) Continuation of application No. PCT/US2006/002922, filed on Jan. 26, 2006.

(60) Provisional application No. 60/647,707, filed on Jan. 27, 2005.

(51) Int. Cl.
*B60N 2/30* (2006.01)
*B60N 2/36* (2006.01)

(52) U.S. Cl. .................... 297/463.1; 297/331; 297/334; 297/378.1; 297/378.12; 296/65.03

(58) Field of Classification Search ................ 297/331, 297/334, 378.1, 378.12, 463.1; 296/65.03
See application file for complete search history.

(56) References Cited

U.S. PATENT DOCUMENTS

| 3,805,325 | A |   | 4/1974  | Lee              |            |
|-----------|---|---|---------|------------------|------------|
| 4,200,329 | A |   | 4/1980  | Inami et al.     |            |
| 4,368,557 | A |   | 1/1983  | Inasawa et al.   |            |
| 4,572,569 | A | * | 2/1986  | HaBmann          | 296/65.17  |
| 4,708,385 | A |   | 11/1987 | Kondo            |            |
| 4,888,854 | A | * | 12/1989 | Russell et al.   | 16/266     |
| 4,909,571 | A |   | 3/1990  | Vidwans et al.   |            |
| 4,958,877 | A | * | 9/1990  | Lezotte et al.   | 297/378.1 X|

(Continued)

FOREIGN PATENT DOCUMENTS

DE        10217196 C1    4/1974

(Continued)

*Primary Examiner*—Rodney B White
(74) *Attorney, Agent, or Firm*—Butzel Long, PC (57) ABSTRACT

A vehicle seat for coupling to the floor of a vehicle comprising a seat back, a seat cushion, a first bracket, and a second bracket. The seat back is pivotable between at least a first position and a design position. The seat cushion is configured to be coupled to the vehicle floor. The first bracket is configured to be coupled to the vehicle floor and includes one of a keyed passage and a keyed pin configured to be received within the keyed passage. The second bracket is coupled to the seat back and includes the other one of the keyed passage and the keyed pin configured to be received within the keyed passage. The keyed passage is configured to receive the keyed pin only when the seat back is in a position the seat back will be prevented from assuming after the vehicle seat has been installed in the vehicle.

26 Claims, 7 Drawing Sheets

U.S. PATENT DOCUMENTS

| | | | |
|---|---|---|---|
| 4,971,395 A | | 11/1990 | Coussemacq et al. |
| 5,015,026 A | | 5/1991 | Mouri |
| 5,038,437 A | * | 8/1991 | Russell et al. ....... 297/378.12 X |
| 5,039,155 A | * | 8/1991 | Suman et al. ............ 296/65.03 |
| 5,263,763 A | * | 11/1993 | Billette .................... 296/65.17 |
| 5,273,336 A | | 12/1993 | Schubring et al. |
| 5,685,612 A | | 11/1997 | MacDonald |
| 5,700,058 A | * | 12/1997 | Balagurumurthy et al. .................... 297/378.1 X |
| 5,716,100 A | * | 2/1998 | Lang ...................... 297/378.12 |
| 6,174,030 B1 | * | 1/2001 | Matsuo .................... 297/463.1 |
| 7,387,333 B2 | * | 6/2008 | Seibold ................. 297/334 X |

FOREIGN PATENT DOCUMENTS

| | | |
|---|---|---|
| EP | 1277611 | 1/2003 |
| FR | 2663889 | 1/1992 |
| FR | 2765532 | 1/1999 |

\* cited by examiner

VEHICLE SEAT

CROSS-REFERENCE TO RELATED PATENT APPLICATIONS

This is a continuation application of International Application No. PCT/US2006/002922, filed Jan. 26, 2006, published on Aug. 3, 2006 (International Publication No. WO2006/081417A1) and claims the benefit of, and priority to U.S. Provisional Application No. 60/647,707, filed Jan. 27, 2005, which are incorporated by reference herein in their entirety.

BACKGROUND

Vehicle seats having pivotally mounted seat backs are a generally known and are a desirable optional feature in vehicles, including in sport utility vehicles, cross-over vehicles and station wagons. A pivotally mounted seat back commonly folds or pivots down onto the seat cushion. It is desirable to fold down the seat back to extend the rear load floor of the vehicle and to provide access to the trunk of a passenger car to increase its cargo carrying capacity.

It is also well known and desirable to optionally split the pivotally mounted seat back into two or more parts that can each be independently folded or pivoted down onto the seat cushion. In this embodiment, one seat back part can be pivoted down onto the rear seat to provide a partially extended rear load or trunk floor for transporting items longer than the cargo or trunk area without the seat back folded down (such as skis, hockey sticks, or the like). In this embodiment, the other part of the seat back of the seat may remain in the design or occupant position to provide a passenger carrying capability.

A variety of designs are known for providing a pivoting seat back in a vehicle. For example, it is known to use a single rod extending through aligned holes in the lower portions of the split seat backs and to have end brackets and a middle bracket between the split seat backs through which the rod also passes. For example, see U.S. Pat. No. 4,971,395. The use of such a single long rod is undesirable since installation of the rod requires alignment and access which may be difficult with modern vehicle architectures. Further if the rod is made unusable, it will likely affect both portions of the split seat back and service is difficult and replacement expensive.

It is generally known to use pivot pins connected to a bracket located on each side of the split seat back and connected to the floor, instead of a single long rod to achieve pivoting of the seat back. In a pivot pin mount device, a bracket having a passage or hole for receiving the pivot pin is mounted on the other of the seat back and the floor from where the pivot pin is mounted. For example, see U.S. Pat. Nos. 5,015,026; and 4,708,385. These devices have a significant drawback during installation. Because the trunk pass-thru typically is completely blocked by the seat backs and the pivot pins must be installed in the holes (one on the seat, the other on the bracket) it is necessary for a seat back installer to bolt the bracket and/or pins to the seat back and/or floor from behind the seat backs (i.e., from within the cargo or trunk area). This is particularly difficult in a two door vehicle and creates significant delays in trying to quickly, efficiently, and ergonomically install the seat backs.

It is also generally known to use a latch mechanism for connecting a foldable seat back to the vehicle structure. It is known to mount or connect the latch on either a bracket connected to the floor or vehicle structure or to mount or connect the latch on the seat back for connection to a pivot pin or to a striker bar connected to the vehicle. For example, see U.S. Pat. Nos. 4,909,571 and 5,685,612. Again, while such designs are known, they are relatively expensive and subject to being operated while the seat back is in a design or occupant position.

It is also generally known to use a spring loaded pivot pin for a vehicle seat back. The spring-loaded pivot pin can be pushed in against the action of the spring to provide for the installation of the vehicle seat back. However, a spring of significant force is needed to insure the pivot pin remains engaged at all times. Accordingly, an installer must use significant effort to overcome the force of the spring while trying to install the seat back, or a tool is required to hold the pivot pin in a retracted position until properly installed.

There remains a significant need for an improved pivot pin design and installation method which overcomes the noted drawbacks and is a robust design and cost effective, including to service. Accordingly, it would be advantageous to have an improved method of installing a pivotally mounted seat back for use in a vehicle. It would be further advantageous to provide a pivotally mounted seat back that can be installed in simple brackets that do not include expensive latches. It also would be advantageous to provide a pivotally mounted seat back that can be easily installed but cannot be easily uninstalled by a vehicle operator as part of the normal use of the vehicle seat.

SUMMARY

One exemplary embodiment relates to a vehicle seat having a seat back pivotable between at least an install position, a stow position and a design position, the vehicle seat also having a seat cushion configured to be installed in the vehicle. A first bracket is configured to be coupled proximate the seat back pivot and the first bracket includes one of a keyed passage and a keyed pin, the keyed pin being configured to be received within the keyed passage. The seat back includes the other one of the keyed passage and the keyed pin. And wherein the keyed passage and the keyed pin are configured so the keyed pin may be installed or removed from the keyed passage only when the seat back is in an install position and the seat back will be prevented from being positioned in the install position after the seat cushion has been installed in the vehicle.

Another exemplary embodiment relates to a method for manufacturing a vehicle seat configured to be installed within a vehicle, the vehicle seat having a seat back and a seat cushion. The method comprises the steps of providing a seat cushion and a seat back; providing a first bracket having one of a keyed pin and a keyed passage configured to receive the keyed pin; providing the other one of the keyed pin and the keyed passage on the seat back; and configuring the seat back, the keyed pin, and the keyed passage such that the seat back must be installed within the vehicle before the seat cushion. The method further comprises the steps of installing the seat back, rotating the seat back from the install position and then installing the seat cushion such that the seat back is in a usable position and is prevented from accessing the install position by the seat cushion.

Still another exemplary embodiment relates to a bracket assembly for coupling a vehicle seat having a seat back and a seat cushion within a vehicle. The bracket assembly comprises a first bracket, a pin, and a second bracket. The first bracket is configured to be coupled to one of the vehicle and the seat back. The pin is coupled to the first bracket and includes a keyed portion. The second bracket is configured to be coupled to the other one of the vehicle and the seat back and includes a keyed passage configured to receive the keyed portion of the pin. The pin and the second bracket are configured so that the keyed portion of the pin is received within the keyed passage of the second bracket only when the seat back is in a position that the seat back is prevented from assuming when the vehicle seat is fully installed within the vehicle.

Another exemplary embodiment relates to a vehicle seat cushion assembly for installing within a vehicle for use by an occupant. The vehicle seat cushion assembly comprises a seat frame, a first bracket, and a second bracket. The seat frame is configured to be located within the vehicle. The first bracket is configured to be coupled to the vehicle and includes one of a keyed passage and a keyed pin configured to be received within the keyed passage. The second bracket is coupled to the seat frame and includes the other one of the keyed passage and the keyed pin configured to be received within the keyed passage. The keyed passage is configured to receive the keyed pin only when the seat frame is in a position the seat frame is prevented from assuming after the vehicle seat cushion assembly has been installed in the vehicle.

The above features and advantages will become more apparent from the following detailed description taken in conjunction with the accompanying drawings.

DESCRIPTION

Figure 1:
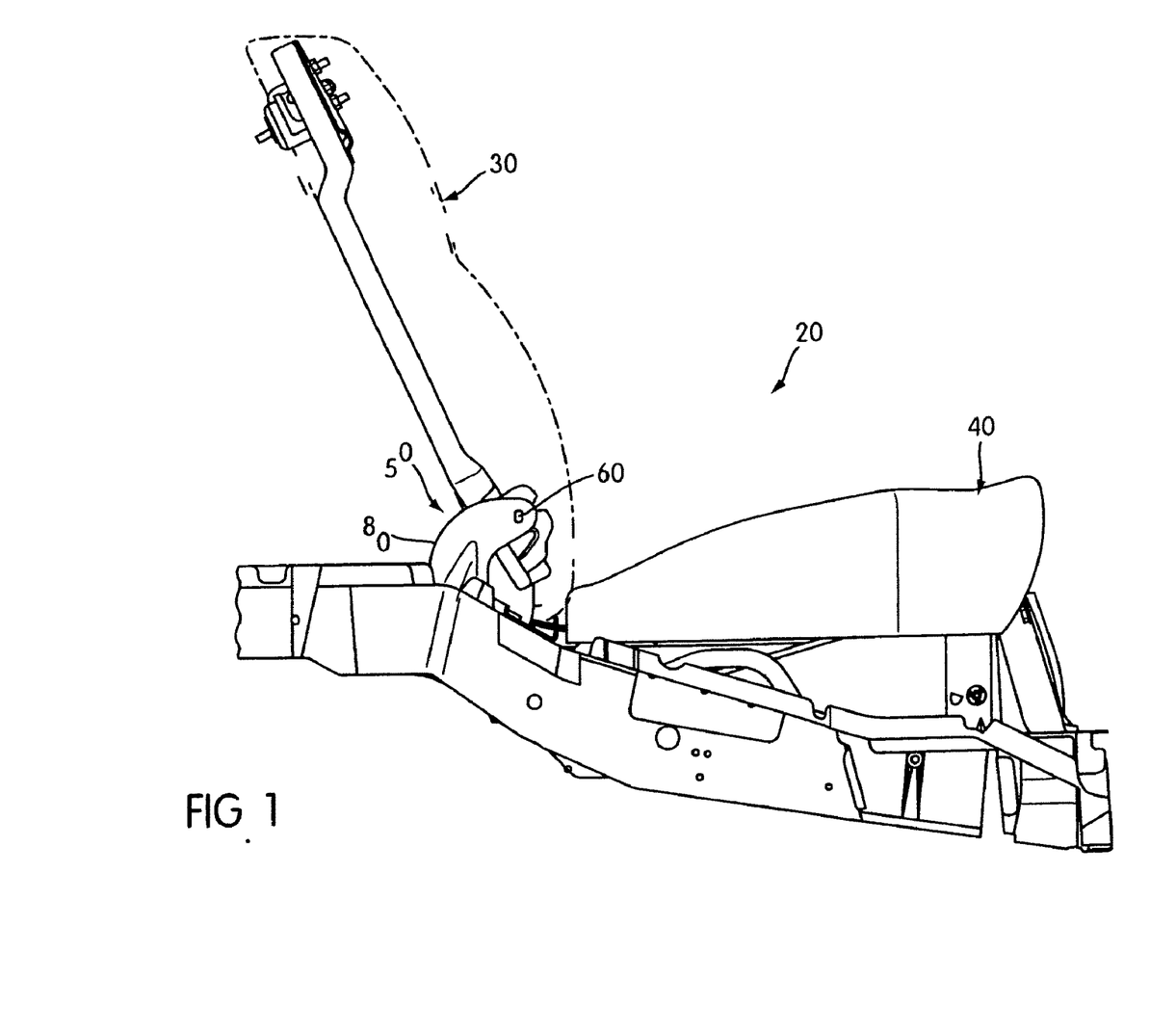
FIG. 1 is a side plan view of a split back rear passenger seat installation having a pivotally mounted seat back according to one exemplary embodiment.

Referring generally to all of the figures, and in particular to FIG. 1, there is shown a vehicle seat 20 for use in a vehicle (not shown). According to one exemplary embodiment, the vehicle seat 20 is for a non-first row of passenger seats in the vehicle and is foldable forward (as compared to the direction of the vehicle). The vehicle seat 20 includes two seat frames or seat portions shown as a seat back 30 and a seat or base cushion 40. The seat back 30 is foldable between a design or occupant position (see FIG. 1) in which the vehicle seat 20 is positioned to allow an occupant to normally occupy the vehicle seat 20, a folded or stow position in which the seat back 30 is pivoted forward from the design position to move the seat back 30 toward the seat cushion 40 (see FIG. 6), and an install or insert position in which the seatback 30 is pivoted to a substantially flat orientation when the seat cushion 40 is not in place (see FIG. 5).

The vehicle seat 20 includes a pivot assembly 50. According to one exemplary embodiment, the pivot assembly 50 includes a pivot pin 60, a keyed seat pivot bracket 70 connected to a lower portion of the seat back 30, and a floor bracket 80 connected to the floor of the vehicle and having the pivot pin 60 connected thereto.

Figure 2:
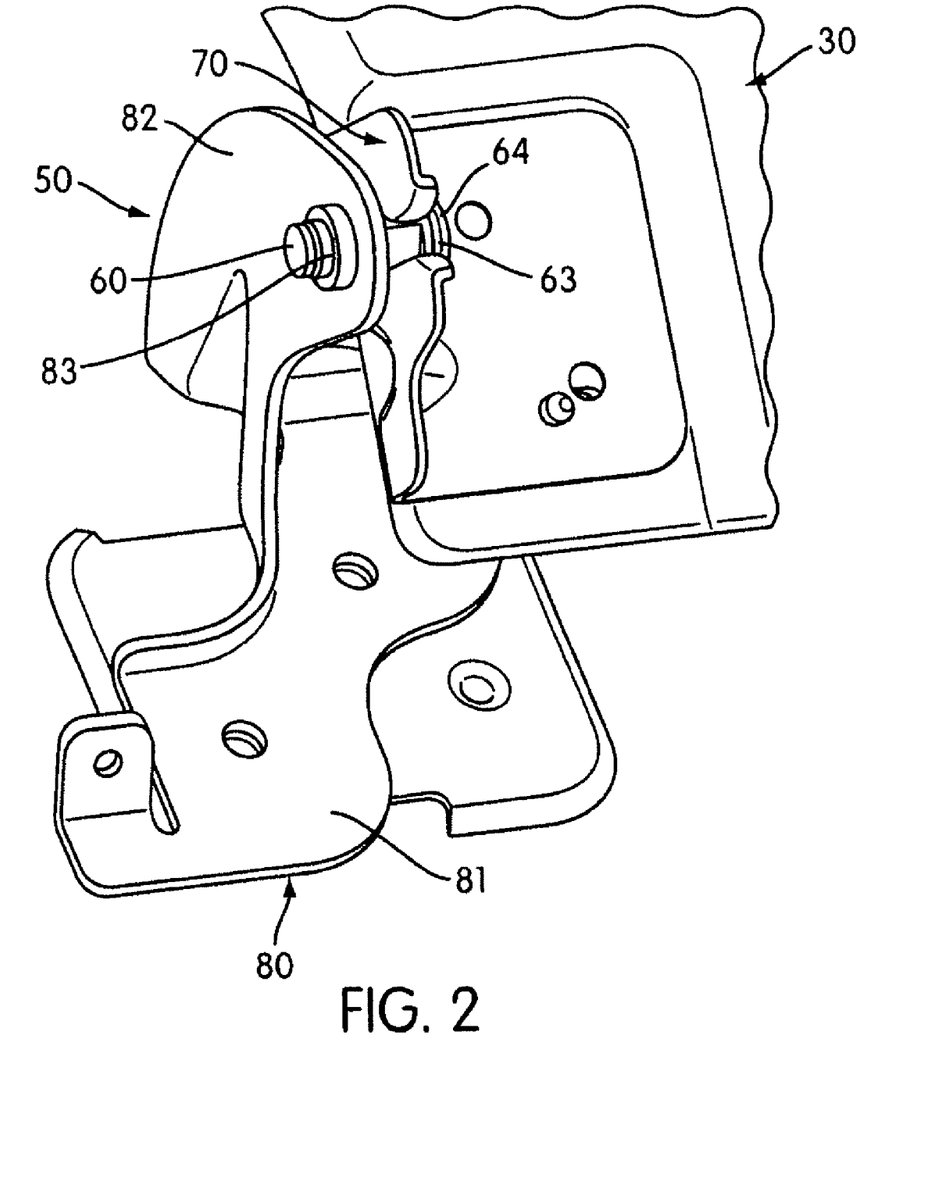
FIG. 2 is a partial perspective view of a portion of the seat shown in FIG. 1 showing a pivot assembly according to one exemplary embodiment.

Referring in particular to FIG. 2, the pivot assembly 50 is shown in more detail. According to one exemplary embodiment, the floor bracket 80 has a lower end portion 81 for connection via a fastener (not shown), such as a threaded bolt, to the floor of the vehicle. The floor bracket 80 further includes an elongated upper portion 82 having a hole 83 fixedly receiving an end 61 of pivot pin 60 therein.

Figure 8:
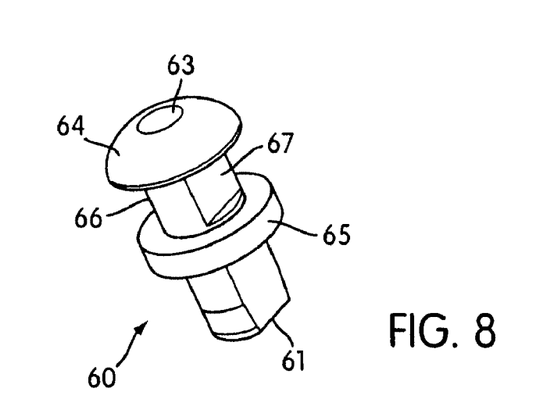
FIG. 8 is a perspective view of a pivot pin of a pivot assembly according to one exemplary embodiment.
Figure 9:
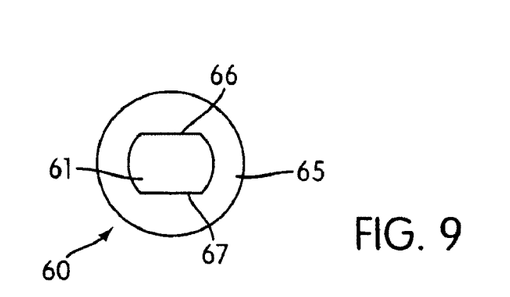
FIG. 9 is an end view of the pivot pin shown in FIG. 8.

Referring to FIGS. 2, 8, and 9, the pivot pin 60 further includes a second end 63 having a flattened head portion 64 and a shoulder portion 65 located between the first end 61 and the second end 63. Between the head portion 64 and the shoulder portion 65, the pivot pin 60 includes a pair of opposing flats 66, 67 to create a double-D portion that is keyed to be received in the seat pivot bracket 70 of the seat back 30.

Figure 3:
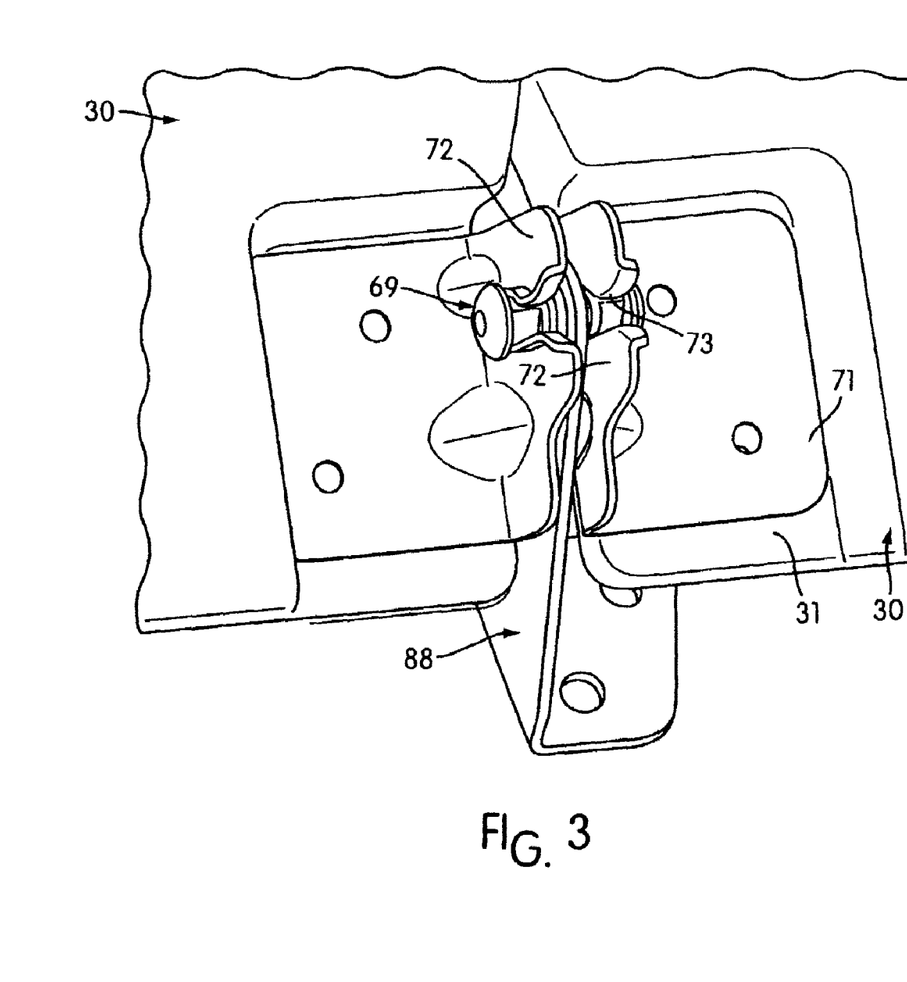
FIG. 3 is a partial perspective view of a double pivot pin assembly according to one exemplary embodiment.
Figure 4A:
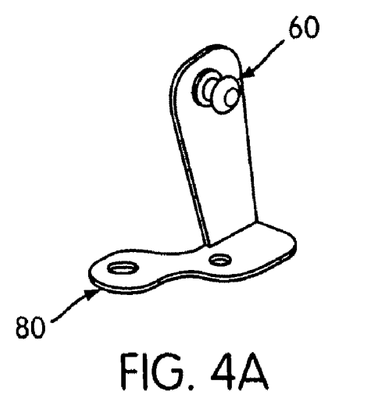
FIGS. 4A through 4E are a series of views of a floor mountable pivot bracket including a pivot pin according to one exemplary embodiment.
Figure 4B:
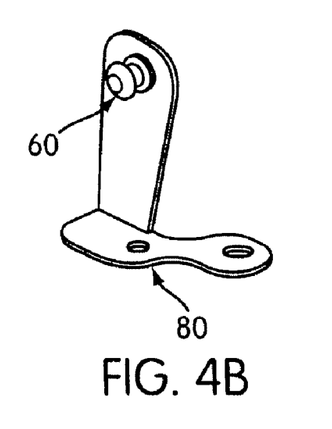
Figure 4C:
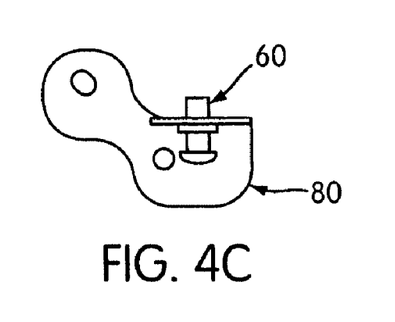
Figure 4D:
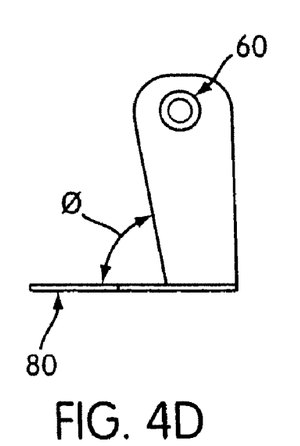
Figure 4E:
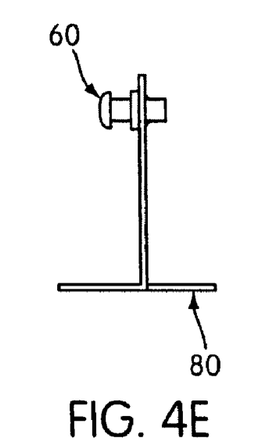
Figure 5:
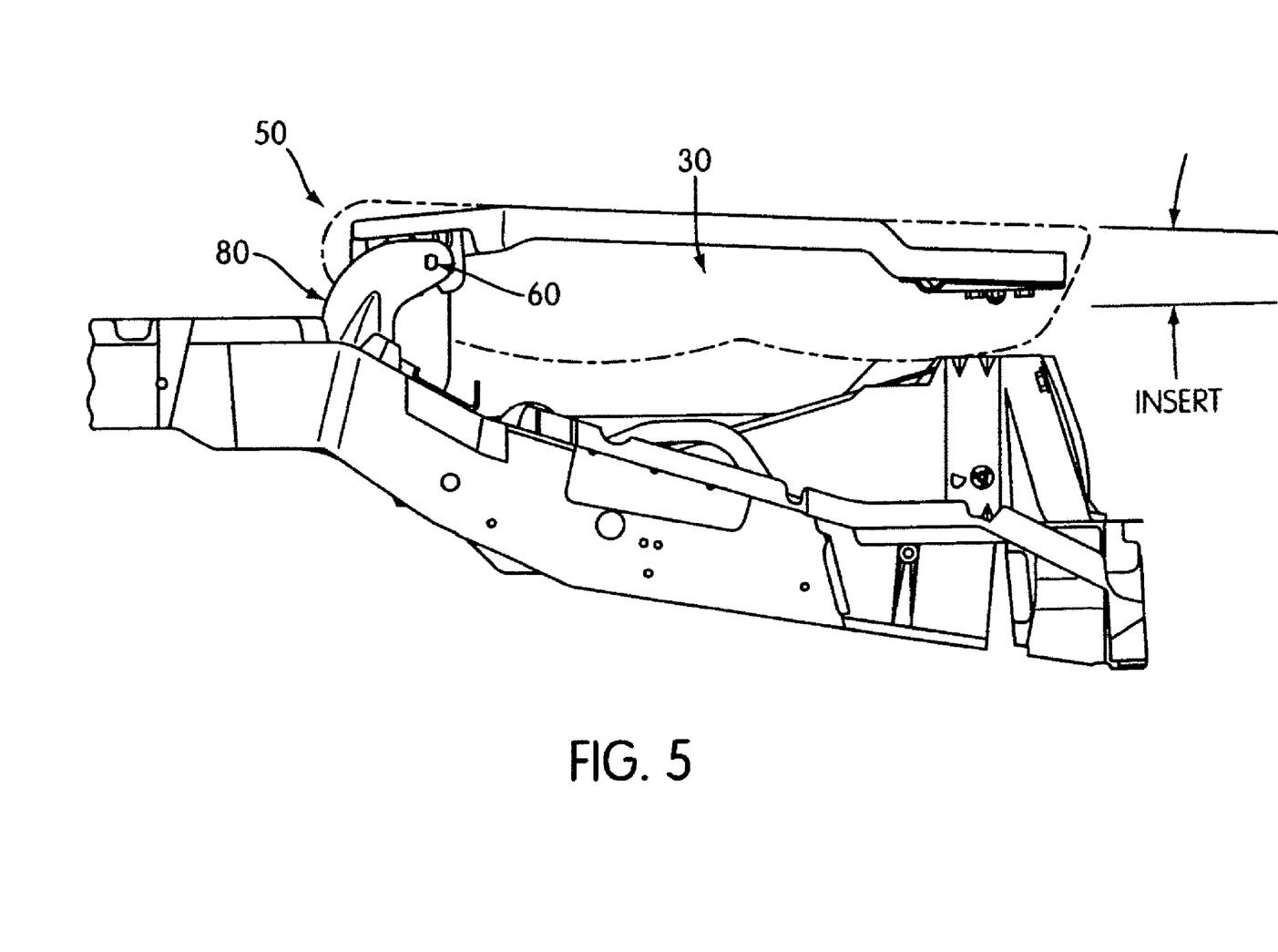
FIG. 5 is a side plan view of the vehicle seat of FIG. 1 with the seat base cushion removed and the seat back shown in the install position.
Figure 6:
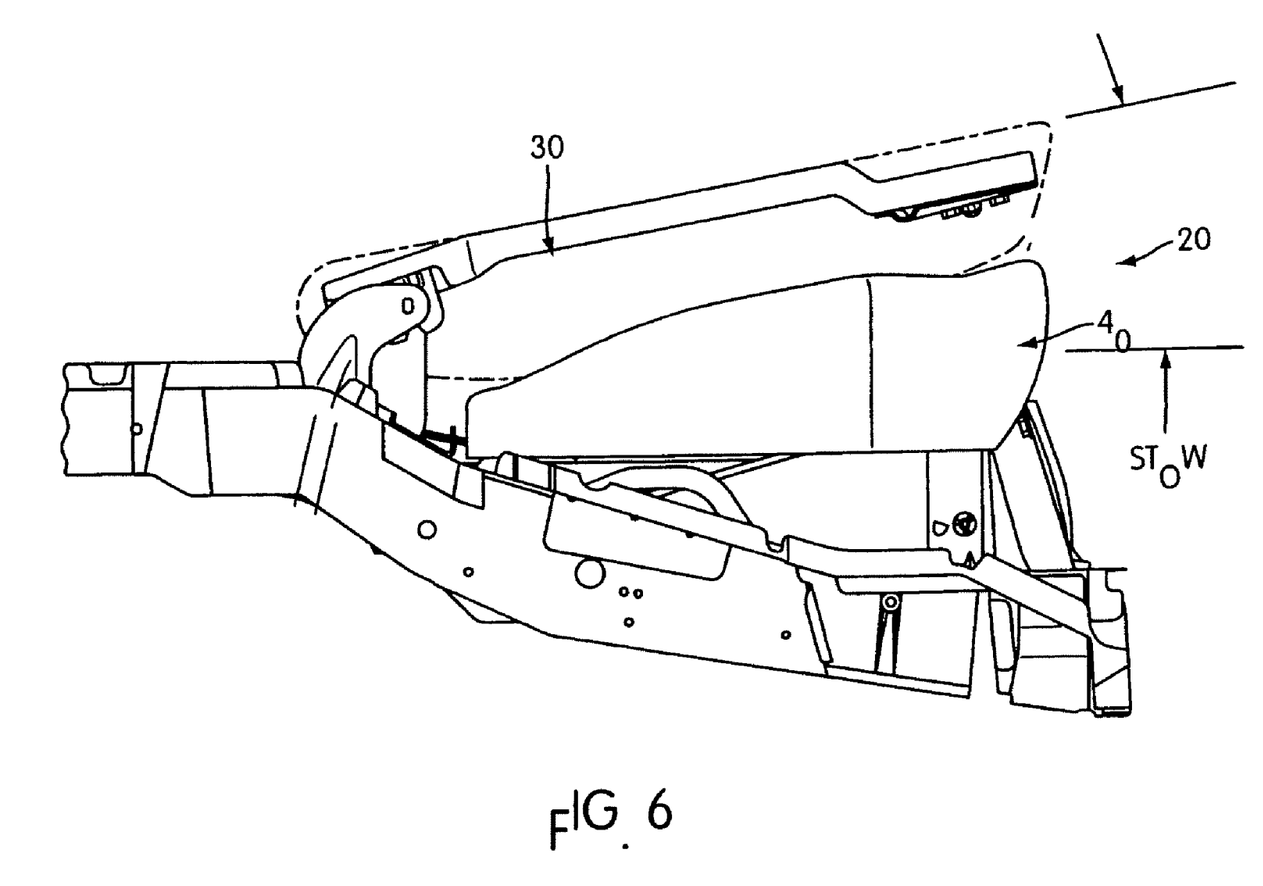
FIG. 6 is a side plan view of the seat of FIG. 1 with the seat base cushion installed and the seat back shown in the folded or stow position.
Figure 7:
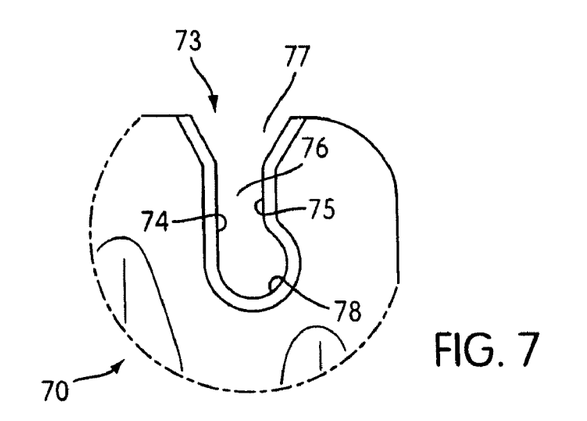
FIG. 7 is a partial plan view of a pivot bracket according to one exemplary embodiment.

Referring with particular reference to FIGS. 3 and 7, the seat pivot bracket 70 includes a first portion 71 for connection to a lower portion 31 of the seat back 30 using any known or appropriate fastener, such as a threaded fastener (not shown). The bracket 70 further includes a second portion 72 integrally formed therewith and positioned at a right angle with the first portion 71. The second portion 72 includes therein a keyed passage 73 for receiving the pivot pin 60. According to one exemplary embodiment, the keyed passage 73 includes a pair of flats 74 and 75 defining a limit passage 76 having an opening 77 and a receiving end 78. The flats 74 and 75, which define the limit passage 76, are preferably designed complementarily with the pivot pin 60 and its flats 66 and 67 to allow the pivot pin 60 to be inserted through the opening 77 and past the limit passage 76 such that the pivot pin 60 is received in receiving end 78 only when the seat back 30 is positioned in an install position, as shown in FIG. 5. The pivot bracket 70 is preferably formed as a stamped and folded, steel, single-piece member but may alternatively be formed in any known or appropriate manner and from any appropriate material.

In an alternative embodiment as shown in FIG. 3, the pivot assembly may be designed to have first and second seat backs 30 connected to a double pin bracket 88 using a double pivot pin 69 wherein the shoulder 65 has double D flats on both sides thereof and has head portions 64 on both ends thereof. According to various other alternative and exemplary embodiments, the pivot pin and the pivot bracket may take any one of a variety of different key configurations that permit the pivot pin to pass through the limit passage of the pivot bracket only when the pivot pin and the pivot bracket are in the appropriate alignment. According to other various alternative and exemplary embodiments, the pivot assembly may be configured so that the only time the pivot pin will align with the limit passage of the pivot bracket is when the seat back is positioned in any particular location it would difficult for the seat back to assume when the seat is fully assembled or when the seat back is positioned in any particular location it generally would not assume during normal use of the seat.

As shown in FIGS. 2 and 4A-4E, the bracket 80 is preferably designed such that second (or upper) portion 82 extends at a right angle from first (or lower end) portion 81 in one plane and also at a predefined acute angle designed to account for the floor angle and the angular location of the flats 66 and 67 of the pivot pin 60 and the flats 74, 75 of the bracket 70. According to one exemplary embodiment, the manner in which second portion 82 extends from first portion 81 is such that the seat back 30 may only be installed when the seat back 30 is positioned where the seat cushion 40 would otherwise be located if it were installed, as shown in FIG. 5.

Referring now in particular to FIG. 5, to install the seat back 30 according to one exemplary embodiment, the seat back 30 is rotated into the area to be occupied by the seat cushion 40, which is not yet installed. In this insert or install position, the seat back 30 is aligned to have the flats 74, 75 of the bracket 70 aligned with the flats 66, 67 of the pivot pin 60 such that the pivot pin 60 passes through the opening 77, the limit passage 76 and into the receiving end 78 of the bracket 70. In the receiving end 78, the pivot pin 60 can rotate. Once inserted or installed, the seat back 30 is pivoted away from the insert position, and the seat cushion 40 is installed using any known or appropriate connection. Preferably, the seat cushion 40 is installed in the vehicle such that it is not removable during normal operating conditions. Once the seat cushion 40 is installed, the seat back 30 may only be rotated until the seat back 30 contacts the top of the seat cushion 40, which is the stow or folded position as shown best in FIG. 6. In the stow position, the flats 74, 75 of the bracket 70 are rotated such that they do not align with the flats 66, 67 of the pivot pin 60 and the pivot pin 60 cannot be moved from the receiving end 78 into the limit passage 76. Accordingly, the bracket 70 of the seat back 30 cannot be uninstalled from the pivot pin 60 connected to the floor bracket 80 when the seat cushion 40 is installed.

When installing the vehicle seat 20, it is preferred to first install the floor bracket 80 in the vehicle with the pivot pin 60 connected thereto. The pivot bracket 70 is preferably connected to the seat back 30. The seat back 30 is then preferably located in the vehicle and aligned in the insert position. Then, the pivot pin 60 is inserted into the keyed passage 73 of the pivot bracket 70 and the seat back 30 is pivoted out of the insert position. The seat cushion 40 is then installed.

It is important to note that the construction and arrangement of the elements of the seating system or arrangement as shown in the exemplary and alternative embodiments are illustrative only. Although only a few exemplary embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited in the claims. It should be understood by a person of ordinary skill in the art that it is possible to interchange the pivot pin 60 and the bracket 70 without departing from the scope of the present invention. In this regard, it would also be understood by a person of ordinary skill in the art that the bracket 70 may be connected to the bracket 80.

Accordingly, all such modifications are intended to be included within the scope of as defined by any appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the embodiments.

What is claimed is:

1. A vehicle seat for use in a vehicle, the vehicle seat comprising:
   a seat back pivotable between at least an install position and a design position;
   a seat cushion configured to be coupled proximate the seat back; and
   a first keyed member configured to be coupled to the vehicle and a complimentary keyed second member configured to be coupled to the seat back and to be coupled with the first keyed member, one of the first and second keyed members defining a horizontal axis and the other of the first and second keyed members being configured to rotate about the horizontal axis; and
   wherein the first and second keyed members are configured to be coupled such that the other of the first and second keyed members connects to the one in a substantially perpendicular direction to the horizontal axis of the one of the first and second keyed members and only couples and decouples from the other of the first and second keyed members when the seat back is in an install position and the seat back will be prevented from being positioned in the install position after the seat cushion has been installed in the vehicle.

2. The vehicle seat of claim 1 wherein the first keyed member is a keyed passage and the complimentary keyed second member is a passage and the keyed passage is configured to receive a keyed pin only when the seat back is in the install position.

3. The vehicle seat of claim 2 wherein the keyed passage is formed in a first bracket and the keyed pin is coupled to a second bracket and the first and second brackets are configured so that when the seat back is in the install position, the seat back will occupy at least a portion of a space that will be occupied by the seat cushion when the vehicle seat is installed in the vehicle.

4. The vehicle seat of claim 3 wherein the first bracket and the second bracket are configured so that the seat cushion will prevent the seat back from being moved into the install position when the vehicle seat is installed in the vehicle.

5. The vehicle seat of claim 3 wherein the keyed pin includes a keyed portion, the keyed portion of the keyed pin including a first pair of opposing flats.

6. The vehicle seat of claim 5 wherein the keyed passage includes a second pair of opposing flats configured to cooperate with the first pair of opposing flats to allow the keyed pin to pass through the keyed passage.

7. The vehicle seat of claim 6 wherein the keyed pin includes a third pair of opposing flats.

8. The vehicle seat of claim 7 further comprising a second seat back and a third bracket coupled to the second seat back, the third bracket including a second keyed passage configured to cooperate with the third pair of opposing flats to allow the keyed pin to pass through the second keyed passage only when the second seat back is in a position the second seat back will be prevented from assuming after the seat cushion has been installed in the vehicle.

9. The vehicle seat of claim 2 wherein the keyed passage includes an open end, a limit passage, and a receiving end.

10. The vehicle seat of claim 9 wherein the receiving end is configured to receive the keyed pin and to allow the seat back to pivot from the install position to a use position.

11. A method for manufacturing a vehicle seat configured to be installed within a vehicle, the vehicle seat having a seat back and a seat cushion, the method comprising the steps of:
providing the seat cushion;
providing the seat back;
providing a first bracket having one of a keyed pin and a keyed passage configured to receive the keyed pin;
providing the other one of the keyed pin and the keyed passage on the seat back;
configuring the seat back, the keyed pin, and the keyed passage such that the seat back must be installed within the vehicle before the seat cushion; and
wherein the keyed passage is configured to receive the keyed pin in a substantially perpendicular direction to the keyed pin and only when the seat back is in a position the seat back is prevented from assuming after the seat cushion has been installed in the vehicle.

12. The method of claim 11 further comprising the steps of providing a first bracket having the keyed pin coupled thereon and providing a second bracket having the keyed passage therein.

13. The method of claim 12 wherein the first bracket and the second bracket are configured so that the keyed pin cannot be removed from the keyed passage after the seat cushion has been installed within the vehicle.

14. A bracket assembly for coupling a vehicle seat having a seat back and a seat cushion within a vehicle, the bracket assembly comprising:
a first bracket configured to be coupled to one of the vehicle and the seat back;
a pin coupled to the first bracket and including a keyed portion;
a second bracket configured to be coupled to the other one of the vehicle and the seat back, the second bracket including a keyed passage configured to receive the keyed portion of the pin; and
wherein the pin and the second bracket are configured so that the keyed portion of the pin is received within the keyed passage of the second bracket in a substantially perpendicular direction to the pin and only when the seat back is in a position that the seat back is prevented from assuming when the vehicle seat is fully installed within the vehicle.

15. The bracket assembly of claim 14 wherein the pin further comprises a head portion and a shoulder portion.

16. The bracket assembly of claim 15 wherein the keyed portion is located between the head portion and the shoulder portion.

17. The bracket assembly of claim 14 wherein the keyed portion comprises a first pair of opposing flats.

18. The bracket assembly of claim 17 wherein the keyed passage of the second bracket includes a second pair of opposing flats configured to cooperate with the first pair of opposing flats.

19. The bracket assembly of claim 14 wherein the keyed passage includes an open end and a receiving end.

20. The bracket assembly of claim 19 wherein the pin is rotatable within the receiving end of the keyed passage.

21. The vehicle seat cushion assembly for installing within a vehicle for use by an occupant, the vehicle seat cushion assembly comprising:
a seat frame configured to be located within the vehicle;
a first bracket configured to be coupled to the vehicle, the first bracket including one of a keyed passage and a keyed pin configured to be received within the keyed passage;
a second bracket coupled to the seat frame and including the other one of the keyed passage and the keyed pin configured to be received within the keyed passage; and
wherein the keyed passage is configured to receive the keyed pin in a substantially perpendicular direction to the keyed pin and only when the seat frame is in a position the seat frame is prevented from assuming after the vehicle seat cushion assembly has been installed in the vehicle.

22. The vehicle seat cushion assembly of claim 21 wherein the seat frame is a seat back frame and wherein the seat back frame is rotatable between an install position and a design position.

23. The vehicle seat cushion assembly of claim 22 further comprising a seat cushion.

24. The vehicle seat cushion assembly of claim 23 wherein the first bracket and the second bracket are configured so that when the seat back frame is in the install position, the seat back will occupy at least a portion of a space that will be occupied by the seat cushion when the vehicle seat cushion assembly is installed in the vehicle.

25. The vehicle seat cushion assembly of claim 21 wherein the keyed pin includes a keyed portion, the keyed portion of the keyed pin including a first pair of opposing flats.

26. The vehicle seat cushion assembly of claim 25 wherein the keyed passage includes a second pair of opposing flats configured to cooperate with the first pair of opposing flats to allow the keyed pin to pass through the keyed passage.

* * * * *